C. B. SCHOENMEHL & W. G. C. KRAUSE.
BATTERY ELECTRODE SUPPORT.
APPLICATION FILED JUNE 10, 1908.
922,729.
Patented May 25, 1909.
2 SHEETS—SHEET 1.
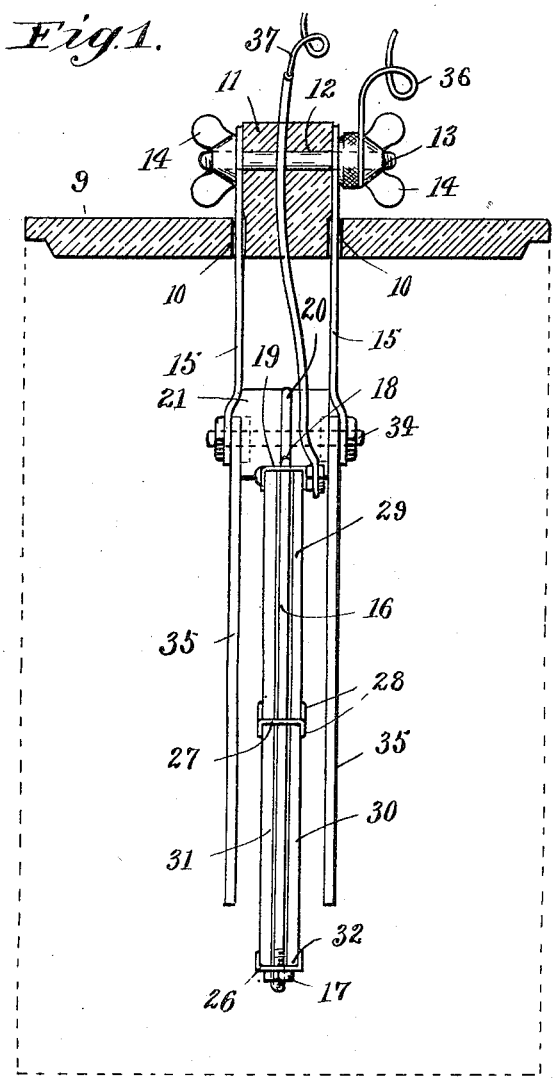
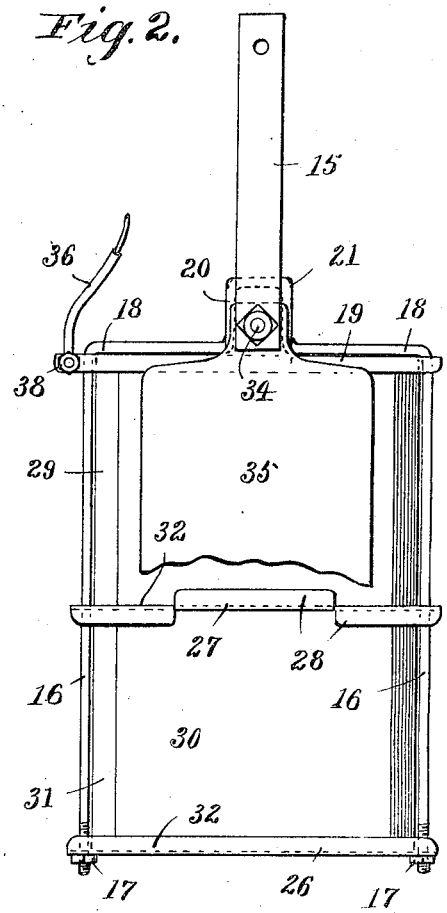
WITNESSES
INVENTORS
Charles B. Schoenmehl
and William G. C. Krause
ATTORNEYS C. B. SCHOENMEHL & W. G. C. KRAUSE.
BATTERY ELECTRODE SUPPORT.
APPLICATION FILED JUNE 10, 1908.
922,729.
Patented May 25, 1909.
2 SHEETS—SHEET 2.
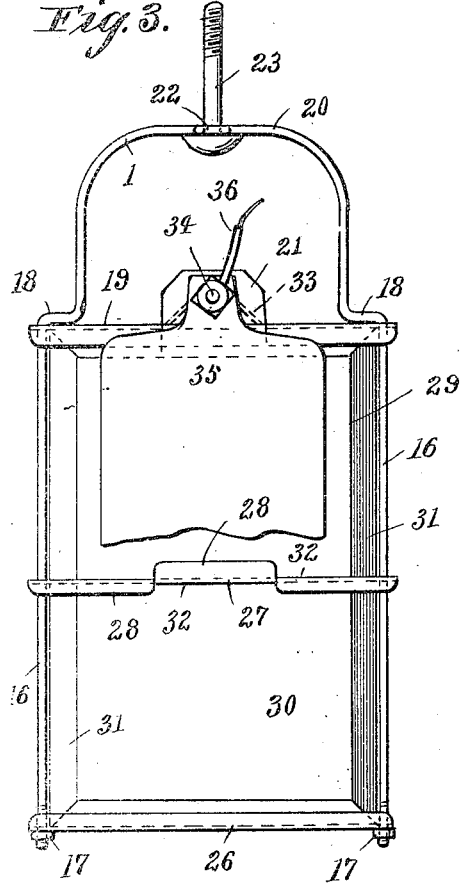
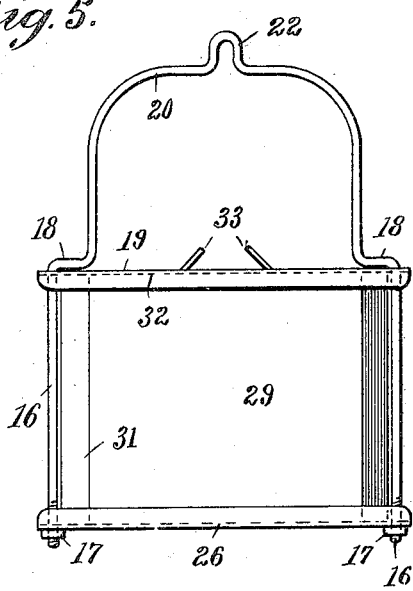
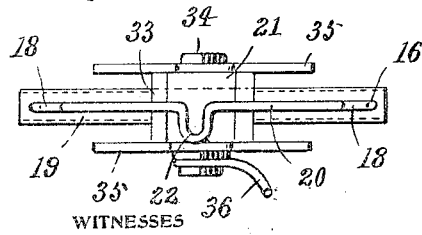
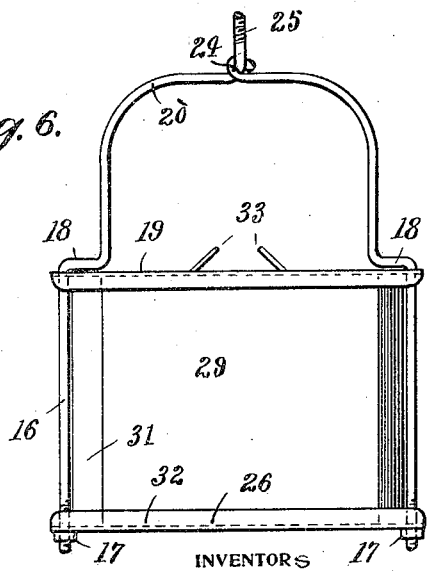
WITNESSES
Elbert O. Hull.
Ruth Raymond.
INVENTORS
Charles B. Schoenmehl
and William G. C. Krause
By Chamberlain & Newman
ATTORNEYS

UNITED STATES PATENT OFFICE.

CHARLES B. SCHOENMEHL AND WILLIAM G. C. KRAUSE, OF WATERBURY, CONNECTICUT; SAID KRAUSE ASSIGNOR TO SAID SCHOENMEHL.

BATTERY-ELECTRODE SUPPORT.

No. 922,729.　　　　Specification of Letters Patent.　　　Patented May 25, 1909.

Application filed June 10, 1908.　Serial No. 437,617.

*To all whom it may concern:*

Be it known that we, CHARLES B. SCHOENMEHL and WILLIAM G. C. KRAUSE, citizens of the United States, and residents of Waterbury, in the county of New Haven and State of Connecticut, have invented certain new and useful Improvements in Battery-Electrode Supports, of which the following is a specification.

This invention relates to supports for battery electrodes for primary batteries, and refers especially to means for supporting such electrodes when in plate form.

It is the object of our invention to provide a simple and inexpensive form of support which can be readily suspended from a battery cover by the operation of but a single screw; to provide a support which engages but two edges of the negative plate electrodes thus leaving the other two edges and both faces entirely free for action; to provide a support that forms a broad and positive engagement with the plate producing a good and sufficient contact, and further to produce a support into which the electrodes may readily be secured.

Upon the accompanying drawings forming a part of this specification similar characters of reference denote like or corresponding parts throughout the several figures and of which, Figure 1, shows a side edge view of our novel electrode support, suspended from a battery cover and with both positive and negative electrodes supported therein. Fig. 2, is a front side view of the support and elements shown in Fig. 1. Fig. 3, is a detached side elevation of our invention adapted for suspension from a slightly different form of battery cover. Fig. 4, is a top plan view of construction shown in Fig. 3, Fig. 5, is a side view of a support, somewhat similar to Fig. 3, but adapted to carry but one negative electrode, and Fig. 6, is a further modified form of the invention the same being formed of two wires instead of one.

Referring in detail to the reference characters marked upon the drawings 9 indicates a common form of battery cover which as shown is provided with holes 10—10 on either side of the central lug 11 on the top side of the cover. A transverse bolt hole 12 is formed through the lug to receive the attaching bolt 13 having binding nuts 14, mounted thereon. The said bolt passes through the holes in the upper ends of the two strips 15 which are passed up through the before mentioned holes 12 of the cover and are secured at their lower ends to the element support and serves as a hanger therefor.

The main part of the frame of the support is formed of wire and is of a general inverted U shape, being preferably formed of a single piece of wire and bent to form the longitudinal sides 16 having their lower extremities threaded to receive the nuts 17. The upper portion of these sides are deflected inward as at 18 to form a shoulder against which the top metal channel strip 19 is seated, while the extreme upper portions are bent over to form a yoke 20 for the engagement of the insulating block 21 as shown in Figs. 1 and 2, or further bent to form a small eye 22 as seen in Figs. 3 to 5 inclusive, with which a suitable bolt 23 is connected for attaching the frame to a cover. In Fig. 6 we have shown a form in which the inverted U shaped wire frame is formed of two parts and connected together by the end of one wire being curled around the other as at 24 and the other wire end 25 being carried up and threaded for connection to the cover.

The channel strip 19 may be of any suitable width and like the lower one 26 has its side edges turned inward to engage the side of the plates. The intermediate channel strip 27 has its edges 28 turned in in two directions to hold both the plate 29 supported above and the plate 30 below. These plates are preferably formed of finely ground and compressed oxid of copper and shaped to form the two or more tapered edges 31 and the thicker and broad end surfaces 32 that are at a right angle to the face. In practice this broad surface 32 lies flat against the inside of the channel strips to form a good and sufficient electrical contact with such strips, which strips in turn are connected with both sides of the wire frame, and to the upper portion of which a field wire is connected.

The insulating blocks 21 are suitably shaped to fit upon the top edge of the top strip 19 and to receive either the yoke 20 or the braces 33 struck up from the top strip which yoke and braces obviously serve to support the block against displacement. A bolt 34 passes through the said blocks and is provided with a nut by means of which the said blocks are secured together, and also by means of which the zinc or positive plates 35 are secured and suspended at either side of negative electrodes.

In the forms shown in Figs. 3 to 6 inclusive one of the field wires 36 would be attached to the bolt 34 connected with the zinc as seen in Fig. 3, while the other wire (not shown) would be attached direct to the end of wire frame or to the bolt 23 supporting the frame. In Figs. 1 and 2 the wire 36 is shown connected with bolt 13 while the other wire 37 is attached to a binding screw 38 in end of top cross strip 19.

Having thus described our invention what we claim and desire to secure by Letters Patent is:—

1. An electrode support for batteries, comprising an inverted U shaped wire frame having nuts threadably attached to its lower free ends, sheet metal channel strips secured to the said wire frame, and means for the attachment of the frame to a battery cover.

2. An electrode support for batteries, comprising an inverted U shaped wire frame having a loop formed in its upper yoke portion, sheet metal channel strips mounted upon the wire frame to engage a plate electrode, and means for holding said strips against the said electrodes.

3. An electrode support for batteries, comprising a wire frame consisting in part of vertically disposed side portions having shoulders formed in their upper end portions, a channel strip mounted upon the said sides against the said shoulders, an additional channel strip mounted upon the lower ends of the said side wires, and means for securing the said strips against an electrode.

4. An electrode support for batteries, comprising an inverted U shaped wire frame having its lower end portions threaded and its upper end portions bent in at right angles to form shoulders and the intermediate yoke portion bent to form an attaching loop, transverse channel strips mounted upon said wire frame portion, and plate electrodes secured intermediate of the said strips, and nuts upon the lower ends of the wire frame to hold the strips and electrodes in position.

5. In an electrode support for batteries, the combination with a U shaped wire frame having an upwardly disposed intermediate loop formed in its yoke portion, nuts secured to the lower extremities of the wire frame, channel strips mounted upon the frame, plate electrodes intermediate the strips, and means for suspending the same from a cover.

6. In an electrode support for batteries, the combination with a U shaped wire frame having an upwardly disposed intermediate loop formed in its yoke portion, nuts secured to the lower extremities of the wire frame, channel strips mounted upon the frame, plate electrodes intermediate the strips, an insulating block secured to the loop portion of the wire frame, zinc electrodes attached to the sides of the insulating block and suspended upon the two sides of the negative electrodes and hangers attached to the support for suspending the same from a cover.

7. An electrode support for batteries, comprising a wire frame, transverse channel strips attached to the frame, positive and negative electrodes carried by the support, binding posts secured to one of the channel strips for the connection of a field wire, and means for suspending the support from a cover.

8. In an electrode support for batteries, the combination with a U shaped wire frame having an upwardly disposed intermediate loop formed in its yoke portion, nuts secured to the lower extremities of the wire frame, channel strips mounted upon the frame, negative plate electrodes intermediate the strips and wire, an insulating block attached to the loop of the yoke, zinc electrodes on the side of block, and a bolt passing through the zincs, block and loop.

Signed at Waterbury in the county of New Haven and State of Connecticut this 2nd day of June A. D., 1908.

CHARLES B. SCHOENMEHL.
WILLIAM G. C. KRAUSE.

Witnesses:
  THEODORE E. ROGERS.
  CARRIE C. ROGERS.